Figure 1:
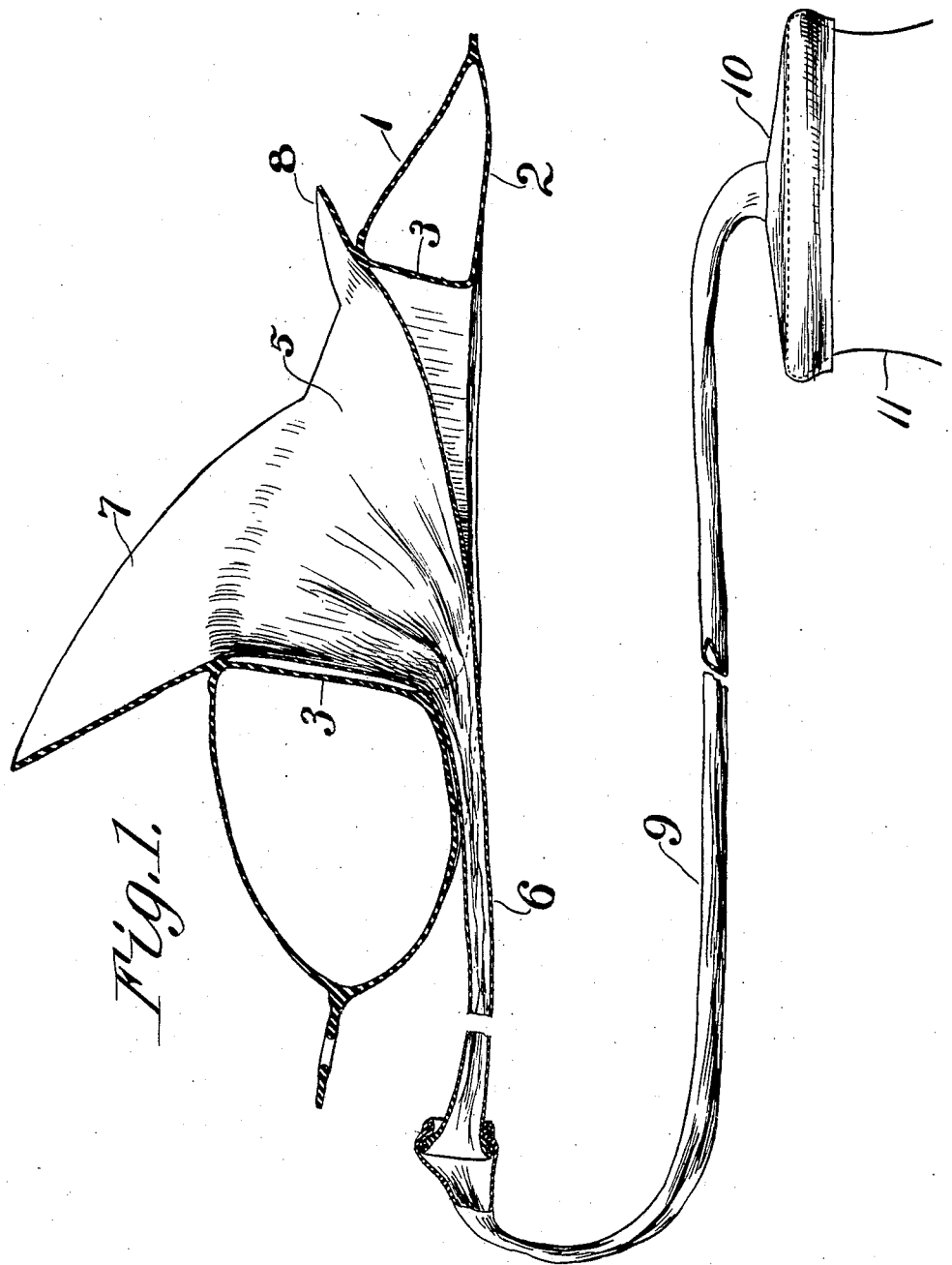

No. 890,681. PATENTED JUNE 16, 1908.
M. MOORE.
BED PAN.
APPLICATION FILED JAN. 26, 1907.

2 SHEETS—SHEET 1.

WITNESSES: Margaret Moore, INVENTOR.
By C. A. Snow & Co.
ATTORNEYS

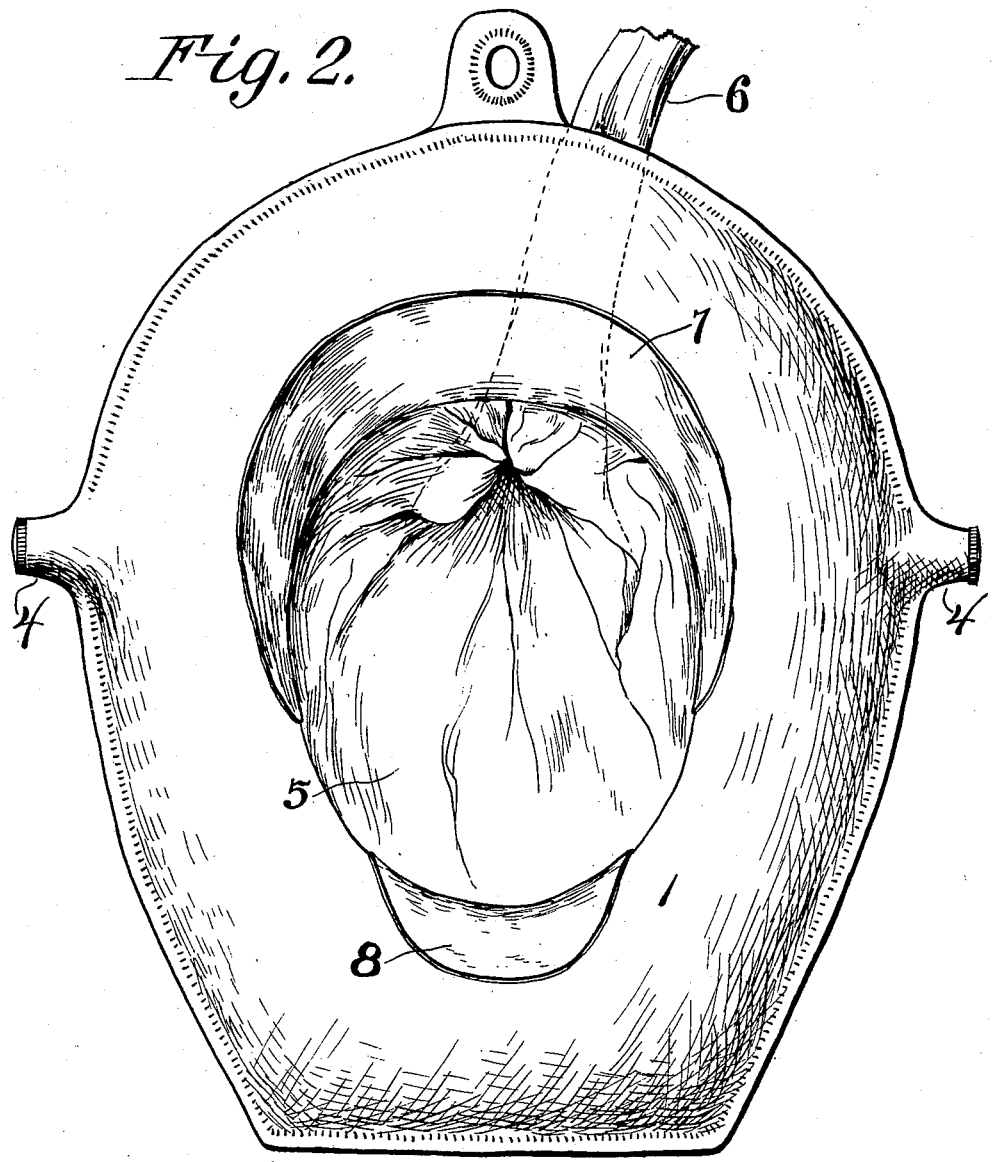

UNITED STATES PATENT OFFICE.

MARGARET MOORE, OF MARBLE ROCK, IOWA.

BED-PAN.

No. 890,681.      Specification of Letters Patent.      Patented June 16, 1908.

Application filed January 26, 1907. Serial No. 354,347.

*To all whom it may concern:*

Be it known that I, MARGARET MOORE, a citizen of the United States, residing at Marble Rock, in the county of Floyd and State of Iowa, have invented a new and useful Bed-Pan, of which the following is a specification.

This invention has relation to bed pans and it consists in the novel construction and arrangement of its parts as hereinafter shown and described.

The object of the invention is to provide a bed pan made of flexible material which may be inflated with air or extended by the injection of water which latter may be chilled or heated to any desired temperature.

When the pan is deflated or collapsed it may be readily slipped under or removed from a patient without excessive lifting, consequently, the pan may be applied with comfort to the patient and ease by the nurse. After the pan is applied it may be extended by injection or inflation so that the patient may be gradually and comfortably lifted. The pan is provided with front and rear shields which join with the pan at the opening thereof. The said opening is provided with a flexible bottom which in turn is provided with a flexible tube. Said tube may be connected with another tubular section, which latter section is provided with a flexible hood adapted to fit tightly over the top of a receiving vessel.

In the accompanying drawing:—Figure 1 is a vertical sectional view of the pan, and Fig. 2 is a top plan view of the same.

The pan proper may be made in pieces put together or formed integrally of flexible material such as rubber. The said pan is provided with the upper and lower sides 1 and 2; the latter of which forms a base and remains substantially flat when the pan is inflated while the upper side arches upward. The said sides are secured directly together at their outer edges. The inner edges of the said sides 1 and 2 are secured together by the wall 3, which assumes a substantially vertical position when the pan is inflated. The pan is provided at its opposite side edges with the nipples 4 through which air or water may be passed between the sides of the pan and as the nipples are located at each side of the pan the said elements may be introduced into the pan from either side of a bed.

The flexible funnel-shaped bottom 5 is attached at its edge to the pan at the meeting edges of the side 1 and wall 3, consequently, when the pan is inflated the said bottom lies within the vertical wall 3, which permits of the passage of material from the bottom 5 through the tube 6, connected therewith without interference. It will be noted by reference to Fig. 1 that the tube 6 forms an integral continuation of the bottom 5, and therefore provides an unobstructed conduit which will materially assist in the escape of matter therefrom. The side 1 is provided at its inner edge with the front shield 7 and the rear shield 8, both of which are made of flexible material and have their lower edges at the upper edge of the bottom 5. It will be observed by reference to Fig. 1 that the bottom presents an unobstructed passage throughout its length whereby to prevent lodgment of any matter, and to facilitate cleansing.

The tube section 9 may be coupled to the tube 6. Said section 9 is provided at its end with a flexible hood 10 which fits closely over the top of a receptacle 11.

As the tube 6 and bottom 5 are flexible, are eversible, whereby cleansing of the parts will be rendered easy, so that the article may always be maintained in a sanitary condition.

Having described my invention what I claim as new and desire to secure by Letters-Patent is:—

1. A substantially annular inflatable bed pan having top and bottom sides joined together at their outer edges, and a substantially vertical wall joining their inner edges, a funnel-shaped bottom, presenting an unobstructed passage throughout its length, secured to the upper edges only of the wall and embodying front and rear oppositely inclined flexible shields of different heights and that constitute continuations of the bottom, and a drain tube forming an integral continuation of the bottom.

2. A substantially annular inflatable bed pan having top and bottom sides joined together at their outer edges, and a substantially vertical wall joining their inner edges, an eversible funnel-shaped bottom presenting an unobstructed passage throughout its length, secured to the upper edges only of the wall and embodying front and rear oppositely inclined flexible shields of different heights and that constitute continuations of the bottom, and a drain tube forming an integral continuation of the bottom.

In testimony that I claim the foregoing as my own, I have hereto affixed my signature in the presence of two witnesses.

MARGARET MOORE.

Witnesses:
MARGARET BOLDAN,
C. D. MILLER.